June 13, 1967  E. D. LEVY  3,325,213
ONE-PIECE CUSHIONED CHAIR
Filed May 17, 1965  3 Sheets-Sheet 1

INVENTOR
EDWARD D. LEVY
BY John F. Holman
ATTORNEY

June 13, 1967  E. D. LEVY  3,325,213
ONE-PIECE CUSHIONED CHAIR
Filed May 17, 1965  3 Sheets-Sheet 2

INVENTOR
EDWARD D. LEVY
BY
ATTORNEY

June 13, 1967     E. D. LEVY     3,325,213

ONE-PIECE CUSHIONED CHAIR

Filed May 17, 1965     3 Sheets-Sheet 3

INVENTOR
EDWARD D. LEVY
BY
ATTORNEY

United States Patent Office 3,325,213
Patented June 13, 1967

3,325,213
ONE-PIECE CUSHIONED CHAIR
Edward D. Levy, Spring Valley, N.Y., assignor to Union Carbide Corporation, a corporation of New York
Filed May 17, 1965, Ser. No. 456,413
3 Claims. (Cl. 297—389)

This invention relates to a one-piece cushioned chair and more particularly to a one-piece chair especially designed and constructed to provide greater safety as well as comfort for an infant riding in an automobile.

Providing adequate safety protection for a child riding in an automobile has been and still is a difficult problem for automobile manufacturers. As every parent well knows, children stand, jump up and down, crawl, and sometimes sit while riding in an automobile. Therefore, protecting them from injury while at the same time allowing them some freedom of movement has been a major task for the manufacturers.

Present day safety devices are generally limited to belts and harnesses. However, these have a number of drawbacks. For example, most of them merely prevent the child from falling off the automobile seat upon sudden deceleration of the automobile. They generally do not have the combined feature of applying retsraining force to the pelvic, chest and shoulder areas while at the same time transmitting the child restraint load to the automobile frame itself rather than to the automobile seat alone. Furthermore, many present day belts and harnesses seldom provide restraint for automobile seat backrests on which the belt or harness is to be installed.

Often, a child's weight is supported merely by a waist belt secured in some manner to the automobile seat or floor. Such a restraining device is ineffective against body jackknifing in a crash. For example, in an automobile accident, a 40-pound child could have a pressure of more than 1200 pounds applied to his abdomen by such a belt, resulting often times in serious internal injuries. If the automobile seat becomes unmounted upon impact, its crash weight is added to that of the child, with the consequence that the combined impact weight of a child and seat can be as high as 3000 pounds.

Another drawback demonstrated by many belts and harnesses is that the child must stand on the automobile seat in order to have a satisfactory viewing position. Such a position is of course uncomfortable as well as unsafe.

Accordingly, it is an object of this invention to provide a safety device which is especially designed and constructed so that a child is guaranteed greater protection and comfort while riding in an automobile.

Another object of this invention is to provide means for transmitting the child restraint load to the automobile structure itself, such as the floor frame.

A further object is to provide means for preventing the backrest of the automobile seat on which the child is riding from pivoting forward upon sudden deceleration of the automobile.

Broadly, the present invention provides a one-piece cushioned chair which comprises a rigid base member, a rigid seat member surmounting the base member and integrally formed therewith having resilient cushion means mounted therein, and a rigid upstanding back member integrally formed with the seat member having resilient cushion means mounted therein. The rigid back member is further provided with a plurality of integrally formed slots adapted to receive restraining means.

A further aspect of the present invention includes the aforementioned one-piece chair having a plurality of restraining straps for the child and the chair strategically secured to the chair and the automobile frame.

Figure 1:
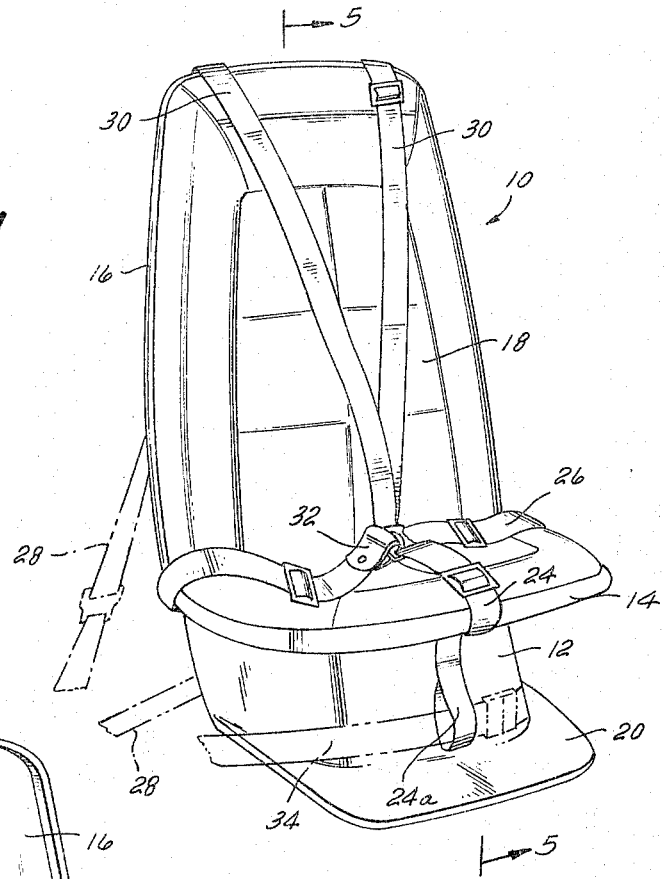
FIG. 1 is an isometric view of a one-piece cushioned chair embodying the invention.

Referring now to the drawing, there is shown in FIG. 1 a one-piece chair 10 having a rigid base member 12, a rigid seat member 14 surmounting the base member, and a rigid upstanding back member 16. The seat member 14 and the back member 16 are generally concave (FIG. 2) and have resilient cushion means 18 mounted therein by suitable adhesive or mechanical means.

Figure 2:
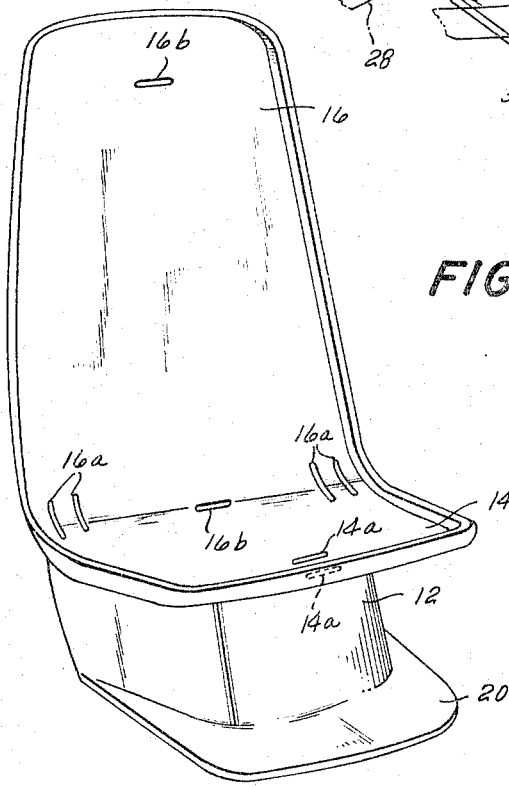
FIG. 2 is an isometric view of the one-piece chair of FIG. 1 illustrating the rigid base, seat, and upstanding back members.
Figure 3:
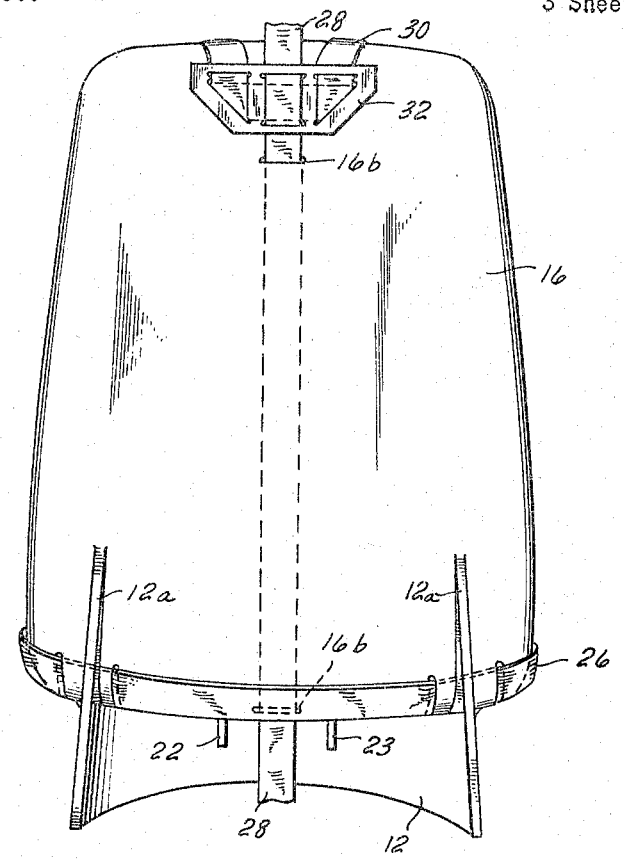
FIG. 3 is a rear elevational view of the one-piece chair of FIG. 1.
Figure 4:
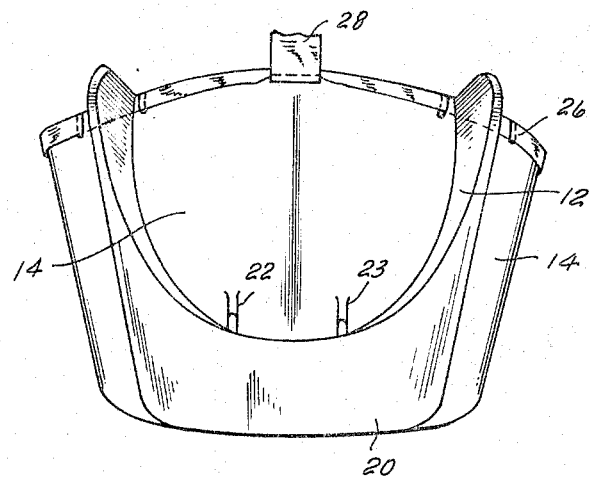
FIG. 4 is a bottom view of the one-piece chair of FIG. 1.
Figure 5:
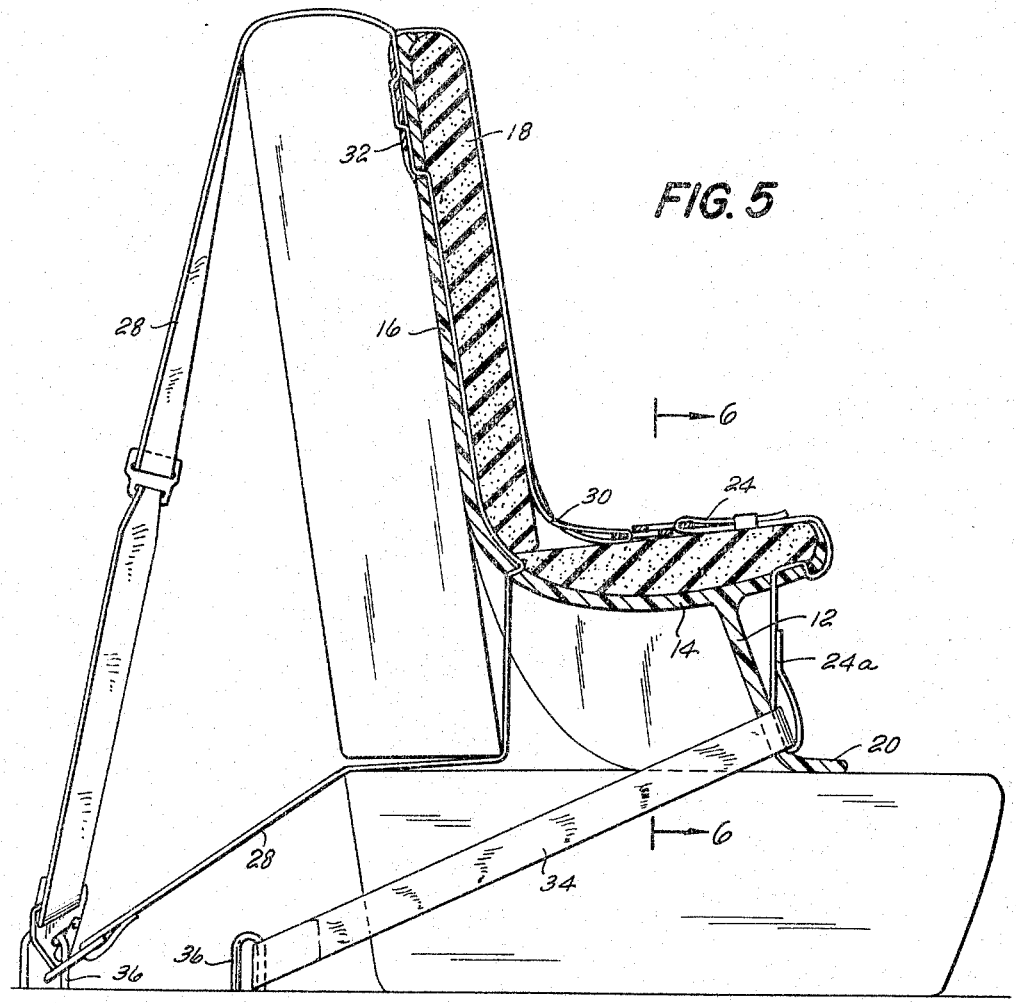
FIG. 5 is a sectional view of the one-piece chair of FIG. 1 taken along line 5—5.
Figure 6:
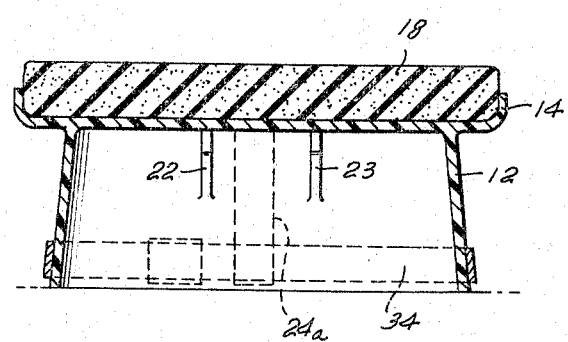
FIG. 6 is a sectional view taken along line 6—6 of FIG. 5.

As shown in FIG. 2, the generally concave seat member 14 is integrally formed with the back member 16 and the base member 12 (FIG. 5). The rear edges 12a of the base member extend upwardly and integrally into the back member 16 (FIG. 3) and serve as reinforcing ribs for the chair 10. Also, as shown in FIGS. 3, 4, and 6, a plurality of reinforcing ribs 22 and 23 are integrally formed with the base member 16 and the seat member 14 and positioned therebetween. The base member 12 is further provided with a rigid flange 20 integrally formed therewith and extending laterally and forwardly from the bottom edge thereof. The flange 20 provides greater stability for the chair 10 when it is resting on an automobile seat such as shown in FIG. 5 and also prevents the backrest portion of an automobile seat from pivoting forward upon sudden deceleration of the automobile.

As further shown in FIG. 2, the seat member 14 has a plurality of integrally formed apertures or slots 14a adapted to receive an adjustable crotch strap 24 (FIG. 1). The back member 16 is also provided with a plurality of integrally formed apertures or slots 16a and 16b adapted to receive an adjustable waist strap 26 (FIG. 1) and an adjustable, combined chair/automobile backrest restraining strap 28 (FIGS. 1, 3 and 5 respectively). All the aforesaid straps are preferably attached to the chair 10 by weaving strapping through the integrally molded slots for such a system eliminates the use of additional hardware.

As illustrated in FIG. 1, a portion of the crotch strap 24 extends downwardly below the seat member 14 in the form of a looped strap 24a adapted to receive a conventional automobile seat belt 34. Also, the chair 10 is provided with adjustable shoulder straps 30 secured to the strap 28 by a metal plate 32 (FIG. 3) positioned near the uppermost portion of the posterior of the upstanding back member 16 and which serve to restrain a child across the upper torso by transferring the restraint load from the comparatively weak abdominal area to the shoulders. The crotch strap 24, waist strap 26 and shoulder straps 30 are connected at a common terminus by a releasable fastening buckle 32, which is designed to disengage easily so as to allow quick release in an emergency. Such an arrangement automatically positions the straps 24, 26 and 30 and prevents the child from sliding downward or being thrown upward out of the chair 10.

A typical arrangement of the chair 10 and its associated straps is readily demonstrated in FIG. 5. The base member 12 forms the basic support for the child and the height of this member raises the child to a comfortable viewing position. Again, flange 20 serves as a wedge in restraining the backrest of the automobile seat from pivoting forward during sudden deceleration. This wedging effect is further aided by the employment of a conventional automobile seat belt 34 around the base member 12 as shown. Additional securement of the chair 10 and the automobile backrest is provided by the use of the strap 28 which is anchored to the floor frame of the automobile by a standard automobile seat belt cleat 36.

Through carefully shaped curves in the structure of the chair 10 and integrally formed reinforcing ribs 12a, 22, 23 (FIG. 4), unique strength properties and high resistance to structural failure are exhibited by the chair of the invention when subjected to external stress. Also, the proportions of the chair are designed to afford maximum support at the back and shoulders of the child. The seat portion itself is kept to a minimum as a child's proportions do not require large surface contact at the seat area. This also allows for greater leg movement and comfort. Additional benefits from these proportions are convenience in consumer handling, storage and reduced shipping costs.

For purposes of the invention, it is preferred to mold the rigid back, seat and base members of the invention by a process which produces an article having a cellular core and a substantial non-cellular integral peripheral shell, for example, rigid foamed high density polyethylene. Such a construction gives an advantageous low ratio of strength to weight. However, other typical choices are thermoplastic compositions such as polypropylene, polystyrene and foams thereof, copolymers of ethylene and propylene mixtures and foams of such polyolefins, and polyvinyl halides. Suitable materials other than thermoplastics which can be substituted for purposes of the invention are wood and metal. While vinyl foam is desirable as the resilient cushion means for the proposed one-piece cushioned chair any comparable cushioning means such as leather and rubber can be employed. However, it is preferred to mold the cushioning means in one piece so that all of the slots or apertures in the chair frame as well as the attaching of the restraining straps to the frame are concealed. Other methods suitable for making the chair of the invention are injection molding, vacuum forming, and compression molding.

While the chair of the invention is suitable as an automobile safety chair for a child, such a chair is equally suitable for home use as well. Furthermore, the size and shape of the chair can be varied to accommodate adults as well as children. For example, the one-piece chair can serve as home, theater, or sports-arena furniture by simply removing the straps. The chair can also be used by children and adults for safety and/or comfort in trains, airplanes, buses, and other modes of transportation.

A novel feature of the chair of the invention is that besides providing comfort, it also provides safety for a child while riding in an automobile. The following examples further illustrate the safety features of the present invention but are not intended to limit the scope thereof in any manner.

A sample of the car seat of the invention having the aforementioned restraining straps in place was tested in accordance with the procedures specified in Society of Automotive Engineers Recommended Practice for Restraining Devices for Children for Use in Motor Vehicles (SAE–J842). The rigid members of the chair tested were molded in accordance with the invention in the form of rigid foamed high density polyethylene having an overall density of 0.70 g./cc. The weight of the chair was 3.25 lbs. The following test results were obtained:

| Test and Units—Webbing | Determined—Seat of This Invention | Required (SAE–J842) |
| --- | --- | --- |
| PELVIC AND UPPER BODY RESTRAINT | | |
| Width, in.: | | |
|   Under No Load | 1½ | $1^{5}/_{16}$ minimum. |
|   Under 1,000 Pound Load | $1^{7}/_{16}$ | $2^{9}/_{32}$ minimum. |
| Breaking Strength, lb | 5,030 | 1,000 minimum. |
| Elongation Under 900 Pound Load, pct | 9 | 40 maximum. |
| Breaking Strength After Abrasion, lb | 4,800 | 900 minimum. |
| Color Fastness, Wet and Dry | Line 4 | Line 3 minimum. |
| Light Fastness, 40 hours | Good | Fair minimum. |
| SEAT BACK RETAINER | | |
| Width, in.: | | |
|   Under No Load | 2 | $1^{5}/_{16}$ minimum. |
|   Under 4,000 Pound Load | 1⅞ | $2^{9}/_{32}$ minimum. |
| Breaking Strength, lb | 6,390 | 4,000 minimum. |
| Elongation Under 2,500 Pound Load, pct | 16 | 25 maximum. |
| Breaking Strength after Abrasion, lb | 6,110 | 3,600 minimum. |
| Color Fastness, Wet and Dry | Line 4 | Line 3 minimum. |
| Light Fastness, 40 hours | Good | Fair minimum. |
| METAL PARTS | | |
| Burrs and Sharp Edges | Passed | Should be free from burrs and sharp edges. |
| RESTRAINT ASSEMBLY | | |
| Minimum Strength, Upper Body and Pelvic Restraint, Combined | Passed | 2,000 minimum. |
| Release Force | 10 | 20 maximum. |
| Slippage Webbing | ¾ | 1½ maximum. |

The test results indicate that the chair of the invention meets the requirements of Society of Automotive Engineers Recommended Practice for Retraining Devices for Children for Use in Motor Vehicles.

The safety features of the chair of the invention were effectively demonstrated in a still further test. Two chairs, each of which were molded and of the same density and weight according to the preceding example, were secured in a typical American automobile as shown in FIG. 5. However, one chair, chair #1, was placed on the front seat of the passenger side and the other, chair #2, was placed on the back seat. A dummy simulated to represent a 6-year old male having a sitting height of 25 inches and weighing 48 pounds was strapped in chair #1 securing the straps as shown in FIG. 1. Another dummy simulated to represent a 4-year old female having a sitting height of 23 inches and weighing 40 pounds was strapped in chair #2 securing the straps as shown in FIG. 1. The automobile was then motivated to crash into a concrete wall at a speed of 30 mph. Upon impact, the estimated stress on the shoulder straps 30 (FIG. 1) was 250 pounds. Although the dummies lifted slightly from their respective chairs on impact, they nevertheless cleared objects in front of them by at least 6 inches before returning to their normal sitting positions. Furthermore, no damage was exhibited by either the dummies, the chair, or the straps after the crash.

I claim:
1. A one-piece cushioned chair which comprises:
   (a) a rigid base member having a rigid flange integrally formed therewith and extending laterally and forwardly from the bottom edge thereof, and a plurality of reinforcing ribs integrally formed therewith and extending therebetween; said base member being adapted to be supported by the seating portion of an automobile seat;
   (b) a rigid seat member surmounting said base member and integrally formed therewith having resilient cushion means mounted therein, said seat member being further provided with a plurality of reinforcing ribs integrally formed therewith and extending therebetween;

(c) a shoulder strap attached to said back member; with said seat member having resilient cushion means mounted therein and a plurality of reinforcing ribs integrally formed therewith and extending integrally within the rear portion of said base member; said back member being adapted to be supported by the backrest portion of an automobile seat;
(d) a crotch strap attached to said seat member and positioned centrally of a front edge thereof;
(e) a shoulder strap attached to said back member;
(f) a waist strap attached to said back member;
(g) said crotch strap, said shoulder strap and said waist strap being fastened conjointly at a common terminus by buckle means, and
(h) said chair being further provided with a strap positioned longitudinally along the wall of said upstanding back member proximate said resilient cushion means and substantialy midway between the side edges thereof, one end of said strap passing through an aperture in an uppermost portion of said upstanding back member upwardly over the top of the backrest portion of an automobile seat and continuing downwardly to the floor structure of said automobile, the opposite end of said strap passing through an aperture in a lowermost portion of said upstanding back member and extending between the backrest portion and the seating portion of said automobile seat downwardly to the floor structure thereof, and means securing said ends of said strap to said floor structure.

2. The one-piece cushioned chair of claim 1 wherein said rigid members comprise high density polyethylene.

3. The one-piece cushioned chair of claim 2 wherein said resilient cushion means comprises vinyl foam.

References Cited

UNITED STATES PATENTS

| Des. 202,265 | 9/1965 | Creist. |
| 2,541,835 | 2/1951 | Saarinen. |
| 2,664,140 | 12/1953 | Kindelberger _____ 297—390 |
| 2,777,502 | 1/1957 | Travis _____ 297—386 X |
| 2,947,350 | 8/1960 | Davis _____ 297—385 |
| 3,034,830 | 5/1962 | Avedon _____ 297—457 X |
| 3,162,864 | 12/1964 | Ouellette _____ 297—385 |
| 3,207,552 | 9/1965 | Loughney _____ 297—250 X |

FOREIGN PATENTS 954,816  4/1964  Great Britain.

DAVID J. WILLIAMOWSKY, *Primary Examiner.*

JAMES T. McCALL, *Examiner.*